(12) United States Patent
Hoffmann et al.

(10) Patent No.: US 11,760,333 B2
(45) Date of Patent: Sep. 19, 2023

(54) METHOD FOR CONTROLLING THE LONGITUDINAL DYNAMICS OF A VEHICLE

(71) Applicant: Continental Teves AG & Co. OHG, Frankfurt am Main (DE)

(72) Inventors: Jens Hoffmann, Frankfurt am Main (DE); Uwe Bach, Frankfurt am Main (DE); Martin Semsch, Frankfurt am Main (DE); Matthias Schulitz, Frankfurt am Main (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 17/199,060

(22) Filed: Mar. 11, 2021

(65) Prior Publication Data
US 2021/0284124 A1    Sep. 16, 2021

(30) Foreign Application Priority Data
Mar. 11, 2020  (DE) .................. 10 2020 203 127.4

(51) Int. Cl.
*B60W 10/04* (2006.01)
*B60W 30/14* (2006.01)
(Continued)

(52) U.S. Cl.
CPC .......... *B60W 10/04* (2013.01); *B60W 30/143* (2013.01); *B60W 50/0097* (2013.01);
(Continued)

(58) Field of Classification Search
CPC .............. B60W 10/04; B60W 30/143; B60W 50/0097; B60W 30/188; B60W 2520/10;
(Continued)

(56) References Cited

U.S. PATENT DOCUMENTS 5,861,724 A * 1/1999 Ackerson ............... H02P 3/14
    318/139
9,376,971 B2 * 6/2016 Luther .................. B61L 27/16
    (Continued)

FOREIGN PATENT DOCUMENTS

CN    104822556 A    8/2015
CN    107571860 A    1/2018
    (Continued)

OTHER PUBLICATIONS

Translation of EP2620343B1 (Year: 2013).*
    (Continued)

*Primary Examiner* — Frederick M Brushaber

(57) ABSTRACT

A method for controlling the longitudinal dynamics of a vehicle, where the vehicle has a friction brake system brakes, a drive system with an electromotive drive acting on at least one wheel, and a battery for supplying power to the electromotive drive determines state information which describes the state of the vehicle and/or the state of the brake system and/or of the drive system. Route information is determined which describes the route profile of the vehicle. An action plan for implementing a future braking request by the friction brakes and/or the electromotive drive on the basis of the state information and the route information is determined. The action plan specifies, for future times and/or areas on the route, whether a braking request of the vehicle is to be implemented by means of the friction brake and/or the drive system and implements a braking request accordingly.

12 Claims, 3 Drawing Sheets

(51) Int. Cl.
*B60W 50/00* (2006.01)
*B60W 30/188* (2012.01)

(52) U.S. Cl.
CPC ....... *B60W 30/188* (2013.01); *B60W 2520/10* (2013.01); *B60W 2540/10* (2013.01)

(58) Field of Classification Search
CPC .. B60W 2540/10; B60W 20/12; B60W 20/13; B60W 2510/244; B60W 2510/246; B60W 2552/15; B60W 2552/20; B60W 2556/10; B60W 10/08; B60W 10/18; B60W 10/184; B60W 30/18109; B60W 30/18127; B60W 2710/08; B60W 2710/18; B60W 30/18181; B60W 40/04; B60W 40/105; B60W 2720/10; B60L 2240/12; B60L 2240/545; B60L 7/24; B60L 58/12; B60L 7/26; B60T 2270/604; B60T 1/10; B60T 7/12; B60T 17/22; B60T 13/74; Y02T 10/70; F16D 61/00; B60Y 2300/18125; B60Y 2300/18183; B60Y 2400/81
See application file for complete search history.

(56) References Cited

U.S. PATENT DOCUMENTS

| | | | |
|---|---|---|---|
| 9,707,957 B2 * | 7/2017 | Shimizu | B60W 20/20 |
| 10,688,986 B2 * | 6/2020 | Shimizu | B62D 15/0285 |
| 2003/0009269 A1 * | 1/2003 | Graf | B60K 6/54 |
| | | | 903/917 |
| 2015/0239474 A1 | 8/2015 | Nakamura | |
| 2015/0298553 A1 | 10/2015 | Maiterth et al. | |
| 2017/0120891 A1 * | 5/2017 | Kishimoto | B60L 50/61 |
| 2017/0158199 A1 * | 6/2017 | Pallett | B60W 30/18163 |
| 2018/0001788 A1 | 1/2018 | Geub et al. | |
| 2019/0001985 A1 | 1/2019 | Jerger et al. | |
| 2019/0210604 A1 | 7/2019 | Limbacher | |
| 2019/0322308 A1 | 10/2019 | Adachi et al. | |
| 2020/0026294 A1 | 1/2020 | Kim | |

FOREIGN PATENT DOCUMENTS

| | | |
|---|---|---|
| CN | 108367753 A | 8/2018 |
| CN | 109878339 A | 6/2019 |
| DE | 102010034672 A1 | 2/2012 |
| DE | 102010054620 A1 | 3/2012 |
| DE | 112010002441 T5 | 9/2012 |
| DE | 102014002111 A1 | 8/2015 |
| DE | 102015008423 A1 | 1/2017 |
| DE | 102016123648 A1 | 6/2017 |
| DE | 102016008363 A1 | 1/2018 |
| EP | 2620343 B1 * | 7/2013 |
| JP | 2006194257 A | 7/2006 |
| JP | 2015162933 A | 9/2015 |
| JP | 2019188962 A | 10/2019 |
| KR | 20190107277 A | 9/2019 |

OTHER PUBLICATIONS

Search Report dated Sep. 8, 2020 from corresponding German Patent Application No. DE 10 2020 203 127.4.
Chinese Office Action dated Apr. 27, 2023 for the counterpart Chinese Patent Application No. 202110259698.9.
Korean Office Action dated Jul. 17, 2023 for the counterpart Korean Patent Application No. 10-2021-0027729 and Global Dossier translation of same.

* cited by examiner

METHOD FOR CONTROLLING THE LONGITUDINAL DYNAMICS OF A VEHICLE

CROSS-REFERENCE TO RELATED APPLICATIONS

This application claims the benefit of German Application 10 2020 203 127.4, filed Mar. 11, 2020. The disclosure of the above application is incorporated herein by reference.

TECHNICAL FIELD

The invention relates to a method and system for controlling the longitudinal dynamics of a vehicle.

BACKGROUND

In vehicles with an electromotive drive, that is to say electric vehicles and hybrid vehicles, it is useful for safety reasons if the friction brakes of the vehicle are configured in such a way that a specific braking torque can always be achieved, with or without recuperation depending on legal requirements. However, the thermal load bearing capacity is often decisive for the dimensioning of the brakes and can decisively influence the costs, weight and installation space.

However, various scenarios have prevented development of recuperative or counter-current braking by means of the electromotive drive basically to dimension the friction brake more compactly, particularly in respect of thermal requirements until now. For example, a virtually fully charged vehicle cannot recuperate, and downhill travel for a long time (for example when descending the Groß-Glockner Mountain) causes the friction brakes to become overloaded.

In addition to the battery management, the thermal load capacity of the electromotive drive also influences to what extent braking can be carried out recuperatively or by active energization of the drive. Depending on the state of the vehicle, varying requirements are made of the friction brakes, and these impede more compact and targeted dimensioning.

Therefore, an arrangement and method for controlling the longitudinal dynamics of a vehicle, which permits more compact and targeted dimensioning of a friction brake of a vehicle with an electromotive drive is desired.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for controlling the longitudinal dynamics of a vehicle, wherein the vehicle has a brake system with friction brakes, and a drive system with an electromotive drive which acts on at least one wheel of the vehicle and a battery for supplying power to the electromotive drive is provided. The method here comprises determining state information which describes the state of the vehicle and/or the state of the brake system and/or of the drive system, determining route information describing the route profile of a future route of the vehicle, determining an action plan for implementing a future braking request by the friction brakes and/or the electromotive drive on the basis of the state information and the route information, wherein the action plan specifies, for future times and/or areas on the route, whether a braking request of the vehicle is to be implemented by means of the friction brake and/or the drive system, and implementing a braking request, triggered in the vehicle, in accordance with the action plan.

The term "longitudinal dynamics" of a vehicle or of a change in the longitudinal dynamics is to be understood here as at least referring to any change in the longitudinal speed of the vehicle, that is to say both braking and acceleration processes.

"State information" of the vehicle is in this context quite generally at least information which describes the state of the vehicle in any form. This information may comprise, for example, current wheel speeds of the vehicle, the duration of a braking process, the brake pressure applied in this context, the pedal travel of a brake pedal, the weight of the vehicle, the inclination of the vehicle or the like.

Braking requests which occur on the basis of the action plan can be implemented in such a way that the existing infrastructure, that is to say the electromotive drive, the battery and the friction brakes, can be utilized as efficiently and uniformly as possible. Initially, it is possible, for example, to take into account in the action plan how the electromotive drive has been used or will be used over a specific section of a route, and whether during subsequent deceleration of the vehicle the braking performance can be generated by the electromotive drive, or the friction brakes have to be used. The action plan accordingly gives a prediction of the number and type of subsequent braking and makes available a braking strategy for future braking requests, on the basis thereof.

After triggering a braking request, it is accordingly firstly checked at what time and/or in what area of the route the vehicle is currently located. How the braking request is to be implemented is subsequently determined for this time and/or area from the action plan, after which the braking request is accordingly implemented. A braking request can be triggered here both by activation of a brake pedal by the vehicle driver and, for example, by an automated driving function such as, for example, an autopilot.

According to one embodiment, the state information which is included in the determination of the action plan here includes at least one of the following variables: the state of charge of the battery, the temperature of the battery, the temperature of the electromotive drive, the temperature of the friction brakes.

The state of charge and/or temperature of the battery therefore provides information as to whether a braking request can be implemented by recuperative braking. On the other hand, the temperature of the electromotive drive provides definitive information as to whether deceleration can be brought about by active energization of the electromotive drive. In this context, the temperature of the electromotive drive can also be divided into a temperature of the electric motor, that is to say of the machine per se, and a temperature of the power electronics, which temperatures are respectively evaluated separately. The temperature of the friction brake also provides definitive information in the same way as to whether the friction brake should be used for a subsequent braking maneuver, or the braking effect would be too small owing to an increased temperature, or would exceed a critical temperature which would damage the friction brake.

Accordingly, according to a further embodiment there is provision that the action plan specifies whether, in the case of implementation of the braking request by the drive system, the drive system is to be actively energized in order to decelerate the vehicle or energy is to be recuperated into the battery via the drive system. Active energization of the electromotive drive in order to decelerate the vehicle can occur here in such a way that the electric motor is actively energized with a negative load angle, with the result that a torque which counteracts the movement of the vehicle builds up, said torque causing the vehicle to be braked.

In order to ensure the most efficient possible utilization of the brake system and of the drive system during the implementation of braking requests, according to a further embodiment there is provision that the determination of the action plan includes the determination of braking processes which are probably necessary for defined areas of the future route owing to the route profile.

For this purpose, recourse can be made to a route map in which specific areas are characterized in such a way that it is possible to derive therefrom whether a braking process will be necessary here or not.

In a further embodiment, this can be assisted by virtue of the fact that the route information includes a bend profile of the future route and/or an altitude profile of the future route. For example, from the information that in a specific route section the route profile is largely straight and steep, with a tight bend adjoining this particular route section, it is possible to determine that a braking process is expected to be necessary at this point.

In this context is also possible to estimate how strongly braking would have to be carried out at this particular point, for example from the gradient of the preceding section, the radius of the adjoining bend and a current speed of the vehicle. This can be taken into account in the planning of the following braking processes within the scope of the action plan.

According to a further embodiment, such an estimation of braking maneuvers which will be necessary in future in specific route sections can furthermore be assisted by virtue of the fact that the route information includes a traffic situation on the future route. Therefore, for example from the information that very dense traffic is present in a specific area of the route, it can be determined that the vehicle will have to be decelerated when it enters this area of the route.

For this purpose, according to a further embodiment there is also provision that route information includes information which has been received indirectly or directly from other vehicles on the future route of the vehicle. There can therefore be provision that the vehicles exchange information directly with one another, for example information relating to the traffic situation or else the route profile. Alternatively or additionally there can also be provision that the vehicles upload the corresponding information onto a server, which the vehicle accesses within the scope of the determination of the action plan, said vehicle retrieving the corresponding information.

As has already been stated above, the state information can be information which describes the state of the vehicle, the brake system and/or of the drive system. In addition to the state information which has already been described above and can be measured directly, specifically temperatures or the state of charge of the battery, as well as variables which can be determined indirectly, such as a currently applied braking force, a vehicle speed or a time period, values derived from such variables can also be used as state information. Accordingly, one embodiment provides that the determination of the state information includes determining a current braking performance which is implemented by the friction brakes. On the basis of the currently implemented braking performance of the friction brake, which is determined in this way, it can then be determined to what extent the friction brakes can still be loaded during future braking maneuvers. In order to determine the currently implemented braking performance, recourse can be made here to temperature models or to corresponding characteristic curves.

For this purpose, according to a further embodiment there can also be provision that the determination of the state information includes evaluating operating parameters of the brake system and/or of the drive system during preceding braking processes. Accordingly, during the evaluation of the performance capability of the friction brake, recourse is also made to a history of preceding braking processes, which permits a more precise estimation of the remaining performance capability of the friction brakes. In addition, such a braking history can also be used to check the plausibility of currently measured values, for example relating to the temperature of the friction brake.

According to a further embodiment there is also provision that the drive system has at least two electromotive drives, wherein the electromotive drives respectively act on different vehicle wheels.

On the basis of this infrastructure there is provision, according to a further embodiment, that the action plan specifies, for specific areas of the future route and/or future times, that a first of the electromotive drives is to generate a drive torque, while a second of the electromotive drives is to recuperate energy into the battery. Therefore, for example at very low external temperatures, it is possible to achieve pre-heating of the electromotive drive, with the result that the electromotive drive can always operate in an optimum temperature range. In this context, the balance between the drive torque and the deceleration torque is preferably configured in such a way that effectively no acceleration or deceleration of the vehicle takes place.

According to a further embodiment there is also provision that the action plan specifies, for specific areas of the future route and/or future times, that a first of the electromotive drives is to generate a drive torque, while a second of the electromotive drives is to be actively energized in order to decelerate the vehicle. Therefore, for example, the battery can be actively discharged by means of recuperation in order to prepare for subsequent deceleration of the vehicle. In this context, the balance between the drive torque and the deceleration torque is also preferably configured in such a way that no acceleration or deceleration of the vehicle takes place.

According to a further embodiment, in a third variant there is provision that the action plan specifies, for specific areas of the future route and/or future times, that a first of the electromotive drives is to be actively energized in order to decelerate the vehicle, while a second of the electromotive drives is to recuperate energy into the battery. Therefore, if the state of charge of the battery actually does not permit purely recuperative braking, at least partially recuperative braking can nevertheless be carried out since the battery is partially discharged again through the active energization of the electromotive drive.

As has already been described above, the way in which a braking request which has been received is to be implemented is decided on the basis of an action plan for future braking maneuvers. In order to arrive at an action plan which is as accurate as possible and which predicts a future situation of the vehicle as precisely as possible, there is provision according to a further embodiment that the method also includes extrapolating the state information while taking into account the action plan and the route information wherein the action plan is defined precisely for future times and/or areas on the route on the basis of the extrapolated state information, e.g. the prediction is updated to a defined braking action. Consequently, in this embodiment the action plan is repeatedly refined iteratively by determining on the basis of a current action plan how the state information of the vehicle will change at later times and/or on later sections of routes along the route. The action plan then continues to be defined in more detail on the basis of this changed information. This more precise definition of the action plan may be carried out continuously during the journey.

Reference has been largely made above to the fact that the action plan specifies how an incoming braking request is to be implemented. However, according to a further embodiment, there is also provision that the action plan specifies, for future times and/or areas on the route, whether an acceleration request of the vehicle is to be implemented by means of the electromotive drive or a combustion drive of the vehicle, wherein the method comprises implementing an acceleration request, triggered in the vehicle, in accordance with the action plan.

In this way, a unified deceleration and acceleration strategy for the vehicle is defined in the action plan, to which strategy recourse can be made, in particular, during automated driving functions. The ways in which the acceleration processes and the deceleration processes function are preferably adjusted to one another in such a way that the vehicle travels along the provided route with the highest possible energy efficiency and least possible use of the friction brake. For this purpose, there can be provision, for example, that during specific acceleration processes purely electrical acceleration is carried out, with the result that the capacity of the electromotive drive is sufficient for subsequent deceleration of the vehicle. In this context, in particular through targeted acceleration of the vehicle by means of the electromotive drive the battery can be placed in a state which permits recuperative braking.

In order to determine an acceleration strategy within the scope of the action plan, recourse can also be made here to information from further driving functions of the vehicle, for example to information from an adaptive cruise control system (ACC). In addition, such an ACC system can also be actuated in accordance with the action plan.

In order to discharge the battery in such a way that recuperative deceleration of the vehicle is possible, there is provision according to a further embodiment that the action plan specifies, for specific areas of the future route and/or future times, that electrical consumers of the vehicle are activated in order to discharge the battery. Therefore, for example additional assemblies such as heating elements or air-conditioning compressors, can be activated as consumers which are appropriate for the requirements.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the text which follows, features that are similar or identical are denoted by the same reference signs.

Figure 1:
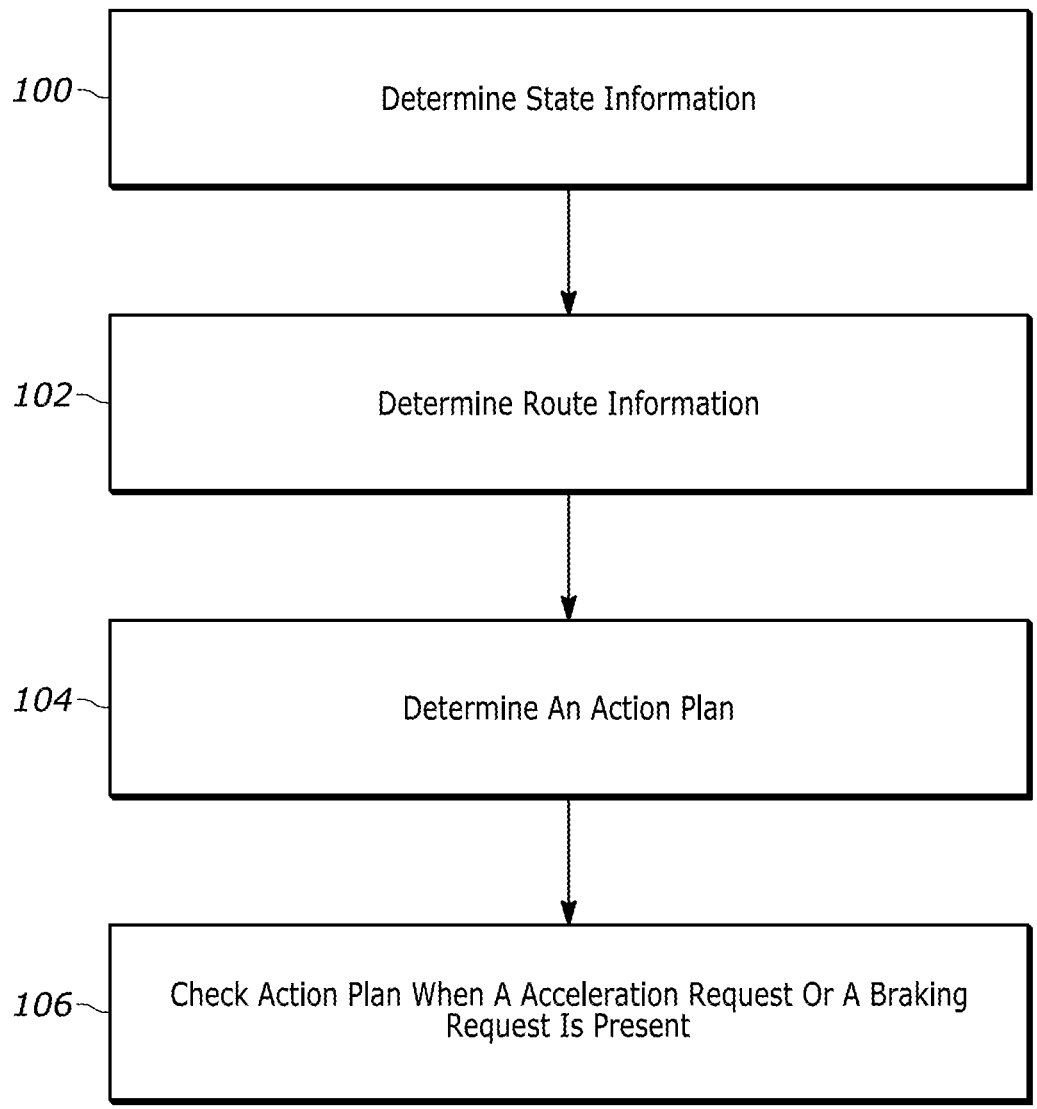
FIG. 1 shows a flowchart of an exemplary method sequence.

FIG. 1 shows a flowchart of an exemplary method sequence. In this context, in a first step 100, state information which describes the state of the vehicle, of the brake system and/or of the drive system is firstly determined. With respect to the state of the vehicle, this information can comprise, for example, a speed of the vehicle, an acceleration of the vehicle, a wheel speed, an inclination of the vehicle relative to the horizontal, or further information which characterizes activation of the brake system. For example output signals of a pedal travel sensor, an applied brake pressure or the duration of a braking process can be used for this.

With respect to the state of the brake system, in particular information which permits a conclusion to be drawn about the vehicle state which is relevant for braking is relevant here. For example, the temperature of the friction brake can be used for this purpose, said temperature providing information on the extent to which a friction brake is loaded and the extent to which it can be further loaded. The temperature of the friction brake can be determined, for example, directly here by means of a corresponding temperature sensor, or can be calculated from a temperature model which, for example, accesses preceding braking maneuvers and evaluates the brake pressures and braking durations occurring in the process. The state of the drive system can be determined by temperature sensors in the electromotive drive, the cooling system of the drive or an inverter connected upstream of the drive. In addition, the sensor system of a battery system can also be triggered in this context, for example in order to determine the state of charge of the battery of the electromotive drive.

In a second step 102, route information which describes the route profile of a future route of the vehicle is subsequently determined. For this purpose, recourse can be made, for example, to the information of a global positioning system (GPS), from which, for example, the bend profile present on the future route or an altitude profile of the future route can be determined. The information relating to the future route can be further refined here by also taking into account a traffic load factor of the future route. For this purpose, recourse can be made, for example, to sources such as a radio data system (RDS), traffic message channel (TMC) or else to the GSM (global system for mobile telecommunications) mobile radio network. In this context, corresponding information can be acquired both from other vehicles as well as from a central source, for example a server for providing traffic information.

After the state information and the route information has been determined, subsequently this data is used in step 104 to determine an action plan which describes how implementation of a future braking request is to be carried out by means of the friction brakes and/or the electromotive drive for future times and/or areas on the route. In this context, the determination of the action plan can also be implemented as an interactive process in which on the basis of a determined action plan it is extrapolated how the state information of the vehicle will change along the route. The action plan can then be refined further on the basis of this extrapolated state information. The objective of the action plan here is to use the existing infrastructure, that is to say the brake system and the drive system, as efficiently as possible during subsequent braking requests and acceleration requests. Particular emphasis is placed here on avoiding excessive use of the friction brake and simultaneously avoiding overloading of the individual components, that is to say, for example, the battery, the electromotive drive or the friction brake.

An exemplary scenario for defining the action plan is described here below. It is determined from the state information here, for example, that the battery is fully charged, and recuperation and consequently recuperative braking is accordingly not possible. In addition, the electromotive drive is not critical in respect of its temperature loading and consequently is fully deployable. However, the friction brake is at a raised temperature, but can still be fully used for emergency braking. In this context, it has been determined for a defined route section, from the travel information, that a high braking performance is necessary, for example, owing to a negative gradient.

In this case, the action plan may provide that in order to implement a braking request the electromotive drive is actively energized, with the result that a deceleration torque is generated. In this way, overheating of the friction brakes is prevented and the battery is at least partially discharged. The friction brake accordingly also continues to be available and is not overloaded.

If an acceleration request or a braking request is subsequently present in step 106, it is firstly checked at what point in the action plan, that is say at what point in time or area of the route, the vehicle is currently located. Taking this as a basis, it is then determined from the action plan how the braking request or acceleration request is to be implemented, after which corresponding implementation of the request is carried out.

Figure 2:
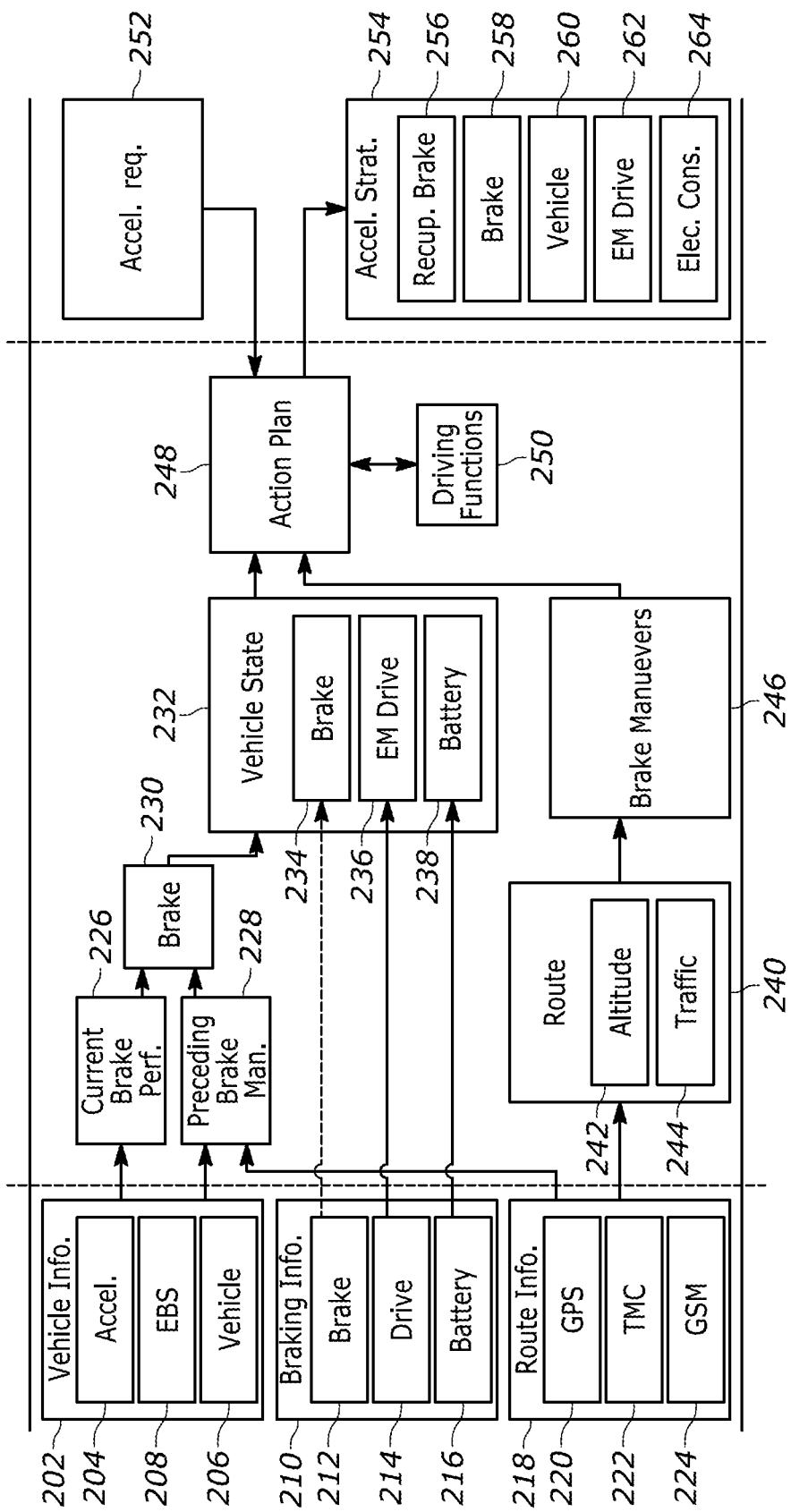
FIG. 2 shows a schematic illustration of an exemplary sequence of the data processing.

FIG. 2 shows a schematic illustration of an exemplary sequence of the data processing within the scope of the method described above.

In this context, the state information and route information are first determined as input signals. In the illustrated variant of the data processing, these are divided into vehicle information 202 which describes the vehicle and its components per se, that is to say for example the vehicle speed and acceleration 204, the inclination of the vehicle 206, or current activation parameters of the brake system 208. In addition, the input signals also contain drive information or braking information 210 which describes the state of the drive system and of the brake system. This includes temperature information of the friction brake 212, temperature information of the drive system 214, that is to say of the electromotive drive, of an inverter and of the cooling system of the drive, as well as information from the sensor system of the battery system 216, which indicate, for example, the state of charge of the battery or its temperature. The vehicle information 202 and the drive information and/or braking information 210 form in combination the state information of the vehicle here.

Finally, the input signals also include the route information 218, which is composed, for example, from data from a GPS system 220, an RDS system or TMC 222 and information from the mobile radio network (GSM) 224. For the data processing, information relating to a currently implemented braking performance of the friction brake 226, along with a possible history of preceding braking maneuvers 228, is derived here, for example, from the vehicle information 202. During the determination of the history of preceding braking maneuvers 228 it is also possible here to have recourse, e.g. to the route information 218.

A temperature model for the friction brake 230 is then generated from the combination of the current braking performance 226 and the history of preceding braking maneuvers 228. This temperature model for the friction brake 230 is then input, together with the drive information and/or braking information 210, into a function block in which a braking-relevant vehicle state 232 is determined from the input signals. The term "braking-relevant vehicle state" is to be understood here as meaning any information which directly provides conclusive information as to the extent to which the friction brakes or the components of the drive system for implementing a braking request or acceleration request can be loaded, and will be able to be loaded in future. For this purpose, a current temperature of the friction brake 234, a thermal load capacity of the electromotive drive 236 and the temperature and/or charging capacity of the battery 238 are determined.

In parallel with the determination of the braking-relevant vehicle state 232, an upcoming route 240 is also determined from the route information 218. In this context, an altitude profile 242 of the upcoming route, as well as a traffic situation 244 on the upcoming route, are also determined. A prediction of the number and type of braking maneuvers 246 to be expected in the future is then produced on the basis of the information relating to the upcoming route 242. The action plan 248 is then determined from the combination of the braking-relevant vehicle states 232 and the braking maneuvers 246 to be expected in the future. The action plan specifies here how a future braking request or acceleration request is to be implemented by the drive system and/or the brake system.

In this context, this action plan 248 can also directly influence driving functions such as an ACC system 250 so that the information obtained from the action plan 248 can also be taken into account when controlling this system.

If a braking request or acceleration request is then triggered 252, the action plan is then used to determine how this request is to be implemented. Accordingly, an optimized braking strategy or acceleration strategy 254 is then used, said strategy specifying, for example, whether the request is to be implemented by recuperative braking 256, by activating the friction brake 258, by active energization of the drive system in order to decelerate the vehicle 260, or by acceleration by means of the electromotive drive 262. The braking and acceleration strategy can also include here the fact that electrical consumers are selectively activated 264 in order to discharge the battery to such an extent that sufficient battery capacity is available for subsequent deceleration of the vehicle by means of recuperative braking.

Figure 3:
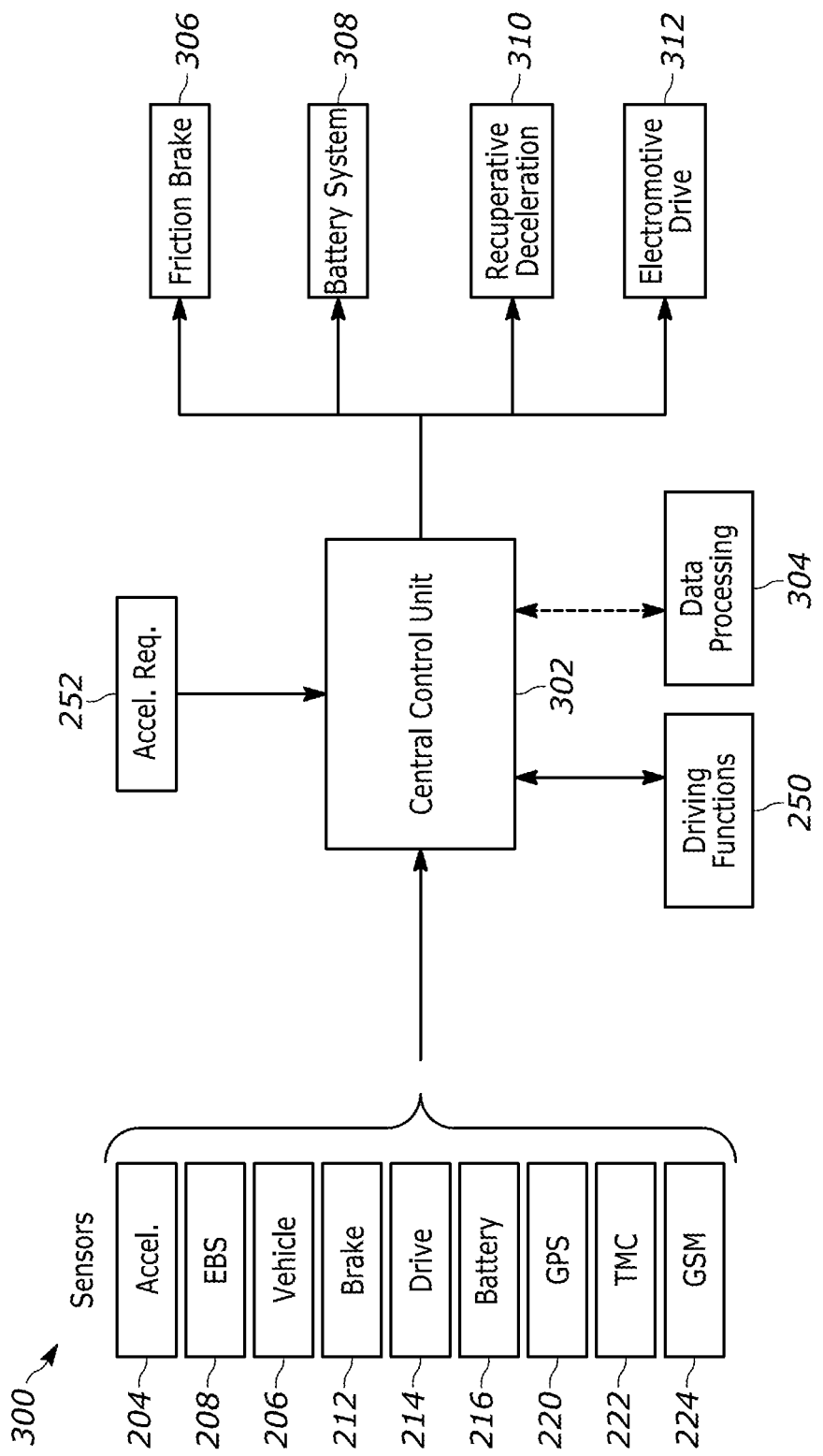
FIG. 3 shows an exemplary system architecture for the implementation of the method.

By analogy to the data processing sequence described above, FIG. 3 finally represents an exemplary system architecture which is suitable for implementing the method. In order to determine the input signals described above, the system architecture has corresponding sensors 300 here. The output signals of the sensors 300 are then provided to a central control unit 302, which determines the action plan 248 from the received signals. In addition, the central control unit 302 is designed to obtain a braking request and/or acceleration request 252. On the basis of the corresponding implementation of the requests according to the action plan 248, the control unit 302 is connected here to further control units of the friction brake 306, of the battery system 308, of the electromotive drive for recuperative deceleration 310 and of the electromotive drive 312, in such a way that it actuates the corresponding control units according to the action plan 248.

In this context, the control unit 302 also communicates with automated driving functions 250, with the result that information derived from the action plan can also be provided to these driving functions. In addition, the control unit 302 also communicates with other vehicles or central servers for data processing 304 using communication interfaces, so that further information can be acquired via these interfaces and in turn input into the determination of the action plan.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for controlling the longitudinal dynamics of a vehicle, wherein the vehicle has a brake system with friction brakes, and a drive system with a plurality of electromotive drive which each act on at least one wheel of the vehicle different from one another and a battery for supplying power to the electromotive drive comprising:
   determining state information which describes the state of at least one of the vehicle, the brake system, and the drive system;
   determining route information which describes the route profile of a future route of the vehicle;
   determining an action plan for implementing a future braking request by at least one of the friction brakes and the plurality of electromotive drives on the basis of the state information and the route information, wherein the action plan specifies, for at least one of future times and areas on the route, whether a braking request of the vehicle is to be implemented by one of: the brake system, the drive system and both the friction system and drive system
   determining for the action plan at least for the one of future times and areas on the route that one of:
      a first electromotive drive of the plurality of electromotive drives is to generate a drive torque for the at least one wheel and a second electromotive drive of the plurality of electromotive drives is to recuperate energy from the associated at least one different wheel;
      the first electromotive drive is to generate a drive torque for the at least one wheel and the second electromotive drive is to be actively energized to decelerate the associated at least one different wheel; and
      the first electromotive drive is to be actively energized to decelerate the at least one wheel and the second electromotive drive is to recuperate energy from the associated at least one different wheel; and
   implementing a braking request, triggered in the vehicle, in accordance with the action plan.

2. The method as claimed in claim 1, wherein the state information comprises at least one of the following variables: the state of charge of the battery, the temperature of the battery, the temperature of the electromotive drive, the temperature of the friction brakes.

3. The method as claimed in claim 1, wherein in the case of implementation of the braking request by the drive system the action plan specifies whether the drive system is to be actively energized in order to decelerate the vehicle or energy is to be recuperated into the battery via the drive system.

4. The method as claimed in claim 1, wherein the determination of the action plan further comprises predicting which braking processes will be necessary for defined areas of the future route owing to the route profile.

5. The method as claimed in claim 1, wherein the route information further comprises at least one of a bend profile of the future route and an altitude profile of the future route.

6. The method as claimed in claim 1, wherein the route information further comprises a traffic situation on the future route.

7. The method as claimed in claim 1, wherein the route information further comprises information which has been received indirectly or directly from other vehicles on the future route of the vehicle.

8. The method as claimed in claim 1, wherein the determination of the state information further comprises the determination of a braking performance currently implemented by the friction brakes.

9. The method as claimed in claim 1, wherein the determination of the state information further comprises evaluating operating parameters of the brake system and/or of the drive system during preceding braking processes.

10. The method as claimed in claim 1, further comprising extrapolating the state information while taking into account the action plan and the route information, wherein the action plan is defined for at least one of the future times and areas on the route on the basis of the extrapolated state information.

11. The method as claimed in claim 1, wherein the action plan specifies, for the at least one future time and area on the route, whether an acceleration request of the vehicle is to be implemented by the electromotive drive or a combustion drive of the vehicle, and further comprises implementing an acceleration request, triggered in the vehicle, in accordance with the action plan.

12. The method as claimed in claim 1, wherein the action plan specifies, for the at least one future time and area on the route that electrical consumers of the vehicle are activated in order to discharge the battery.

* * * * *